US010572933B2

(12) United States Patent
Verweij

(10) Patent No.: US 10,572,933 B2
(45) Date of Patent: Feb. 25, 2020

(54) PASSENGER CATERING SYSTEM FOR A PASSENGER TRANSPORT VEHICLE

(71) Applicant: Zodiac Aircatering Equipment Europe B.V., Alkmaar (NL)

(72) Inventor: Ronald Verweij, Alkmaar (NL)

(73) Assignee: Safran Cabin Netherlands N.V., Alkmaar (NL)

( * ) Notice: Subject to any disclaimer, the term of this patent is extended or adjusted under 35 U.S.C. 154(b) by 306 days.

(21) Appl. No.: 15/519,163

(22) PCT Filed: Oct. 14, 2015

(86) PCT No.: PCT/NL2015/050719
§ 371 (c)(1),
(2) Date: Apr. 14, 2017

(87) PCT Pub. No.: WO2016/060561
PCT Pub. Date: Apr. 21, 2016

(65) Prior Publication Data
US 2017/0236195 A1    Aug. 17, 2017

(30) Foreign Application Priority Data

Oct. 14, 2014    (NL) .................................... 2013635

(51) Int. Cl.
*G06Q 30/00* (2012.01)
*G06Q 30/06* (2012.01)
(Continued)

(52) U.S. Cl.
CPC ..... *G06Q 30/0641* (2013.01); *B64D 11/0007* (2013.01); *B64D 11/0015* (2013.01);
(Continued)

(58) Field of Classification Search
CPC .... G06Q 30/06; G06Q 30/0641; G06Q 50/12; G06Q 10/08; G06Q 10/087;
(Continued)

(56) References Cited

U.S. PATENT DOCUMENTS 4,897,714 A * 1/1990 Ichise ................ B64D 11/0015
340/3.51
5,311,302 A * 5/1994 Berry ...................... A63F 13/08
348/14.03
(Continued)

FOREIGN PATENT DOCUMENTS

| DE | 102006026078 A1 | 6/2007 |
| EP | 0801342 A2 | 10/1997 |
| WO | 03/000568 A1 | 1/2003 |

OTHER PUBLICATIONS

Hao Liu "In-flight Entertainment System: State of the Art and Research Directions", Second International Workshop on Semantic Media Adaptation and Personalization, © 2007 IEEE (Year: 2007).*
(Continued)

*Primary Examiner* — Naeem U Haq
(74) *Attorney, Agent, or Firm* — N.V. Nederlandsch Octrooibureau; Catherine A. Shultz; Katelyn J. Bernier

(57) ABSTRACT

The invention relates to a method for operating a passenger catering system by using a server, the server comprising a processor and a memory unit, wherein the processor is connected to the memory unit and wherein the processor is configured to execute the following steps:
  receiving first input data from a passenger interface device;
  comparing the first input data with stock data in a database stored in the memory unit; and
  transmitting first output data to a crew interface device; wherein the first output data comprise data on available stock coinciding with the received first input data.

(Continued)

The invention also relates to a passenger catering system for a passenger transport vehicle operated via the server.

18 Claims, 1 Drawing Sheet

(51) Int. Cl.
  *B64D 11/00* (2006.01)
  *B64D 11/04* (2006.01)
  *G01C 21/20* (2006.01)
  *G06Q 50/12* (2012.01)
(52) U.S. Cl.
  CPC ............ *B64D 11/04* (2013.01); *G01C 21/206* (2013.01); *G06Q 50/12* (2013.01)
(58) Field of Classification Search
  CPC .. G06Q 10/0833; G01C 21/16; G01C 21/206; B64D 11/04; B64D 11/0015; B64D 11/0007
  See application file for complete search history.

(56) References Cited

U.S. PATENT DOCUMENTS

| | | | |
|---|---|---|---|
| 6,177,887 B1* | 1/2001 | Jerome | B64D 11/0007 340/5.9 |
| 6,499,027 B1* | 12/2002 | Weinberger | G06F 16/40 |
| 8,543,259 B2* | 9/2013 | Schalla | B64D 11/0015 701/14 |
| 2003/0110085 A1* | 6/2003 | Murren | G06Q 30/02 705/26.61 |
| 2009/0112377 A1 | 4/2009 | Schalla et al. | |
| 2009/0112378 A1* | 4/2009 | Robb | B64D 11/0015 701/3 |
| 2009/0288123 A1* | 11/2009 | Havlovick | B64D 11/0015 725/77 |
| 2010/0224727 A1 | 9/2010 | Bauer et al. | |

OTHER PUBLICATIONS

Bauer et al., "Intelligentes Catering mit RFID—Prozesse, Logistik and Integration neuer Technologien im Luftfahrtcatering", Fraunhofer IAO, 2010.

* cited by examiner

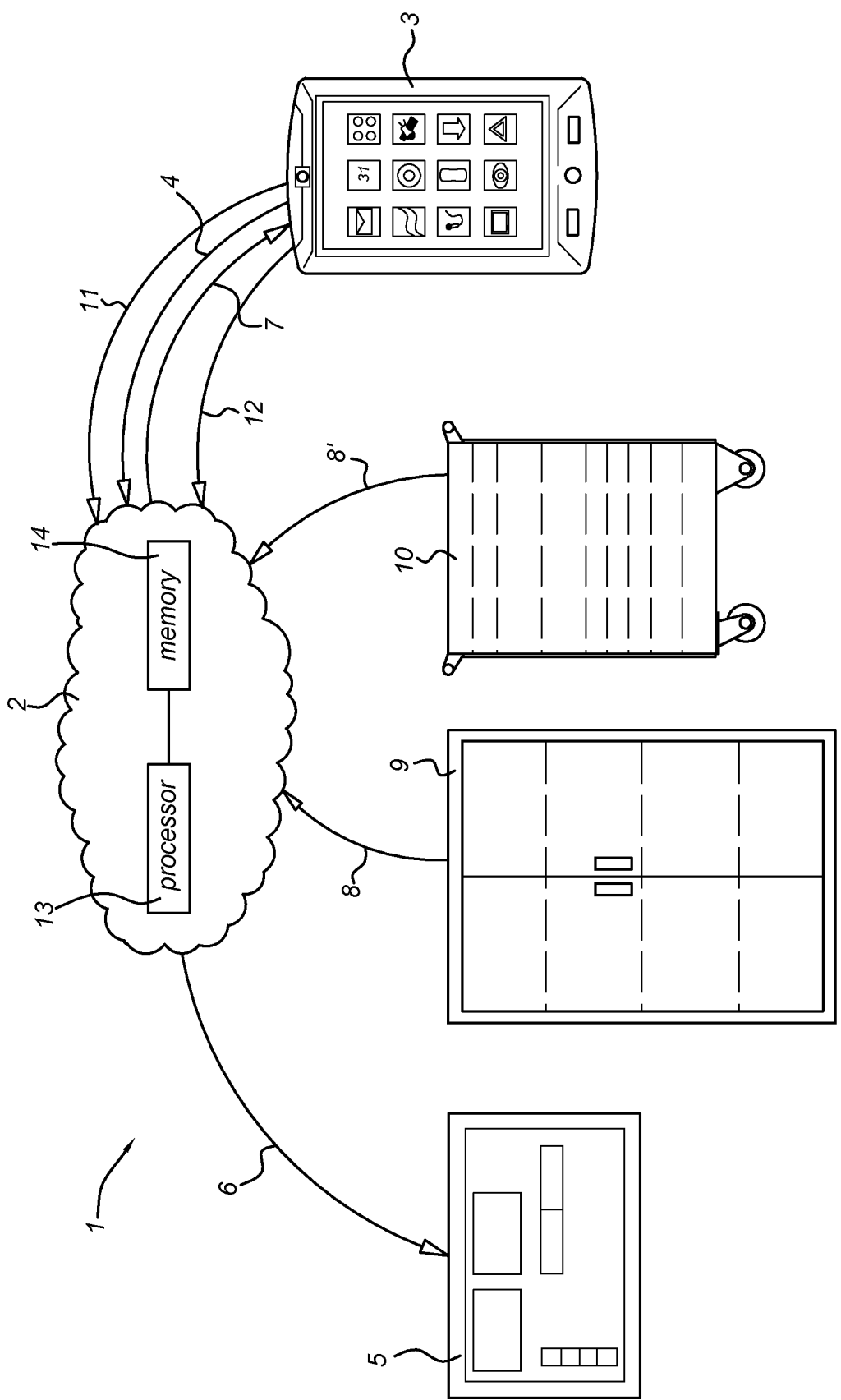

PASSENGER CATERING SYSTEM FOR A PASSENGER TRANSPORT VEHICLE

BACKGROUND OF THE INVENTION

Field of the Invention

The present invention relates to a passenger catering system for a passenger transport vehicle, in particular for an aircraft. Furthermore, the invention relates to a method for use of a server for such a passenger transport vehicle and a computer program loaded onto such a server.

Description of the Related Art

Catering passengers on board of a passenger transport vehicle can be done in several ways. On board of a train for instance, one or more carriages of the train can be dedicated to catering passengers as a dining or restaurant car. Passengers can go to such a dining car and order drinks or food before returning to their seats or even eat and/or drink in the dining car.

On board of coach busses or airplanes, accommodating space is usually limited and only a small part of the bus or airplane is dedicated to a galley for storing and/or prepare food and/or drinks. Due to such a limited space, passengers are usually catered while seated by a crew member on scheduled times and with limited offer. Especially airline companies are more and more offering a wider number of possibilities for menus matching dietary requests of their passengers. However, a number of meals are offered on fixed moments, such as half an hour from take off, half-way the flight and half an hour before landing. Because of these fixed moments of catering, it is possible that a passenger is not seated or is asleep, missing the catering round. Additionally, on these fixed catering moments, the crew has to ask each passenger on the dietary requirements to serve the right meal and to ask for the desired accompanying drink.

Moreover, ordering of a meal or requesting support outside of these fixed moments is usually a hassle for both crew and passengers, as first a notification signal has to be given to the crew by the passenger, usually a light that has to be noted by the always busy crew, before a crew member will approach the passenger to receive the order or request for support. The crew member then has to return to the galley to prepare the ordered meal, or to process the request for support, and again has to enter the passenger cabin to serve the requested meal to the passenger or to provide the support requested. This cycle of ordering and serving is thus time consuming for both passenger and crew.

It would therefore be desirable to provide an alternative passenger catering system and an alternative method of passenger ordering and catering that alleviated at least some of the perceived inconveniences of the prior art.

BRIEF SUMMARY OF THE INVENTION

According to the invention, there is provided a passenger catering system for a passenger transport vehicle, the system comprising:
- a server comprising a processor and a memory unit, wherein the processor is connected to the memory unit and wherein a computer program as describe below is loaded onto the memory unit, wherein the server is arranged to receive first input data from a passenger interface device;
- a crew interface device used by a crew member to read out first output data; wherein the server compares the first input data with stock data in a database stored in the memory unit and the server transmits the first output data to the crew interface device, which first output data comprise data on available stock coinciding with the received input data.

The passenger catering system allows a passenger of a passenger transport vehicle to order products, such as food or drinks, duty-free products or requests for support, before or during the journey with the passenger transport vehicle. The resulting self-service gives the passenger freedom to order a product at a particular time, independent of any schedule known from the prior art. Limitations on the time span in which the ordered products will be served by a crew member can be loaded onto the server and transmitted to the passenger interface device as second output data. The server receives the first input data from a passenger interface device, which first input data are processed by a processor and compared to a database of available products. The server then sends first output data on available products matching with the received first input data to the crew interface device.

According to an embodiment, the system comprises a galley container comprising the stock, wherein the stock data comprise data on the stock in the galley container and wherein the first output data comprise data on available stock in the galley container coinciding with the received input data.

Preferably, the crew interface device is a portable device, such as a smartphone or a tablet. With a portable device, the crew interface device can be used on different locations when necessary.

According to an embodiment, the passenger catering system comprises the passenger interface device. This may be the case when the passenger interface device is located at a central travel hub, such as an airport, train station or bus station. When using such a passenger interface device, the first input data may be entered before departure or even boarding of the passenger transport vehicle. The passenger interface device may be a personal computer or a laptop at a location remote from the central travel hub, such as a pc at home, which pc or laptop can be connected to the server of the passenger catering system via a dedicated application loaded onto the pc or laptop or via a wireless local area network and/or an internet connection. Alternatively, the passenger interface device may be an integral part of the onboard entertainment system that can be used on board of the passenger transport vehicle. Such an onboard entertainment system can comprise a display to show video-on-demand, news, and games and/or a device to play music, etc., which display may be used as the passenger interface device.

According to a further embodiment, the passenger interface device is a portable device, such as a smartphone or a tablet. The portable device may be part of the passenger catering system, but may also be a portable device owned by the passenger that can be connected to the server of the passenger catering system via a computer program, such as a dedicated application, or via a wireless local area network and/or an internet connection.

The passenger interface device may be used to send other data then the first input data. This data may comprise a review of the crew, catered products, service and/or condition of the passenger cabin and related spaces.

According to an embodiment, the first input data comprises a product order from the stock in the galley container and a reservation of the product is made in the database after receipt of the first input data. The first input data are compared with the stock data on the stock present in the galley container. To have reliable stock data a reservation of the product ordered via the first input data is made in the database. Upon making such a reservation, the first input data is coupled to a product and the database is updated accordingly. A reservation on a product means that the product cannot be linked to further first input data. A product can be a meal, including food and/or a drink, or consumer goods, such as cosmetics, decorative products or otherwise, for instance from the duty-free shop, or a request for support.

The first input data may additionally comprise data on the desired time of serving. The time of serving can be a predetermined moment according to a schedule, which schedule can be transmitted to the passenger interface device as second output data. Preferably, the time of serving can be chosen flexibly during the period of passenger transport. In this way, the passenger is in full control of the catering schedule.

Alternatively, a predetermined schedule of the time of serving products can be transmitted as second output data to the passenger interface device, possibly with suggestions on what product will be served on each moment. The passenger can then change this schedule and/or the ordered products according to his/her wishes. These changes will then be transmitted as the first input data to the server.

Upon receipt of second input data for cancelling the order of the product from the passenger interface device, the reservation of the product is cancelled and the database is updated accordingly. Cancelling a reservation means that after updating the database, the product can be linked to further first input data and be reserved by another passenger or by the same passenger at a different moment. The second input data can be actively transmitted by the passenger interface device, for instance when the passenger actively pushes a cancellation button provided via the passenger interface device, or can be passively transmitted by the passenger interface device. This passive cancellation can be executed when the passenger associated with the first input data does not show up in time, i.e. a no-show, or when the passenger associated with the first input data has not timely confirmed the first input data via a confirmation button provided via the passenger interface device. The confirmation of the first input data can be transmitted as fourth input data to the server.

After the first output data and/or the fourth input data are transmitted to and received by the crew interface device, a crew member is informed on the wishes of the passenger and can serve the ordered products to the passenger. During assembly of the order or after serving of the passenger, third input data from a galley container containing the stock is transmitted to the server, wherein the third input data comprises data on the stock, the method further comprising updating the stock data in the database to the stock in the galley. The third input data can comprise a confirmation that the product has actually been removed from the stock in the galley container.

According to an embodiment, the system comprises a moveable galley container containing products ordered according to the first input data, wherein the moveable galley container is used to serve the ordered products to a passenger matching the first input data. Preferably, the crew interface device is mechanically connectable to the moveable galley container. Particularly when the crew interface is a portable device, it may be convenient to connect the crew interface device to the moveable galley container or trolley upon serving.

According to a further embodiment, the system comprises a data connection between the crew interface device and the moveable galley container for exchanging data, such that data from the moveable galley container is receivable and/or transmittable by the crew interface device and vice versa. This data connection can be a wireless local area network connection or a connection established via a data wire.

Preferably, the crew interface device is switchable from a galley mode when in the galley of a passenger transport vehicle, to a cabin mode when in a passenger cabin of a passenger transport vehicle. The galley of the system may comprise a first docking station for stationing the crew interface device, wherein when stationing the crew interface device in the first docking station the crew interface device is in the galley mode. Such a docking station can comprise a data connection for exchanging data with the server and/or an electrical connection for charging a battery of the crew interface device. Furthermore, the moveable galley container may comprise a second docking station for stationing the crew interface device, wherein when stationing the crew interface device in the second docking station the crew interface is in the cabin mode. The data connection of the trolley described above can be provided in the docking station of the trolley.

According to an embodiment, the passenger catering system comprises an indoor positioning system for localizing the crew interface device and/or the moveable galley container in a passenger transport vehicle. Such an indoor positioning system can also be used to match metadata comprised in the first input data to a passenger seat. These metadata can be composed by the passenger interface device and can comprise passenger seat location, passenger name, dietary requests, requests made by the passenger, method of payment, and/or trip information (flight number, date of travelling, departure time, etc.). The metadata could also comprise a complete passenger profile comprising the mentioned examples above.

An indoor positioning system (IPS) is a system based on magnetic, other sensor data or a network of devices used to wirelessly locate objects or people inside a structure, such as a passenger transport vehicle or building. Instead of using satellites, an IPS relies on magnetic positioning, dead reckoning, or nearby anchors (nodes with a known position), which either actively locate tags or provide ambient location or environmental context for devices to get sensed. The localized nature of an IPS has resulted in design fragmentation, with systems making use of various optical, radio or even acoustic technologies. Systems design may take into account that an unambiguous locating service will require at least three independent measures per target, i.e. trilateration. Probable designs of IPS include magnetic positioning, inertial measurements such as dead reckoning, wireless technologies such as Wi-Fi-based positioning system (WPS), Bluetooth or Received Signal Strength Indication (RSSI).

Magnetic positioning is based on the iron inside structures that create local variations in the Earth's magnetic field. Compass chips inside smartphones can sense and record these magnetic variations to map indoor locations.

Dead reckoning proposes an inertial measurement unit carried by a pedestrian either by measuring steps indirectly (step counting) or in a foot mounted approach, sometimes referring to maps or other additional sensors to constrain the inherent sensor drift encountered with inertial navigation. Inertial measures generally cover the differentials of motion, hence the location gets determined with integrating and thus requires integration constants to provide results.

Any wireless technology can be used for locating. Many different systems take advantage of existing wireless infrastructure for indoor positioning. There are three primary system topology options for hardware and software configuration, network-based, terminal-based, and terminal-assisted. Positioning accuracy can be increased at the expense of wireless infrastructure equipment and installations. Wi-Fi-based positioning system (WPS) is used where GPS is inadequate. The localization technique used for positioning with wireless access points is based on measuring the intensity of the received signal (received signal strength (RSS)) and the method of "fingerprinting". Typical parameters useful to geolocate the WiFi hotspot or wireless access point include the SSID and the MAC address of the access point. The accuracy depends on the number of positions that have been entered into the database. The possible signal fluctuations that may occur can increase errors and inaccuracies in the path of the user.

Bluetooth is all about proximity, not about exact location. Bluetooth was not intended to offer a pinned location like GPS, however is known as a geo-fence or micro-fence solution which makes it an indoor proximity solution, not an indoor positioning solution.

Received signal strength indication (RSSI) is a measurement of the power level received by sensor. Because radio waves propagate according to the inverse-square law, distance can be approximated based on the relationship between transmitted and received signal strength (the transmission strength is a constant based on the equipment being used), as long as no other errors contribute to faulty results. The inside of structures is not free space, so accuracy is significantly impacted by reflection and absorption from walls. Non-stationary objects such as doors, furniture, and people can pose an even greater problem, as they can affect the signal strength in dynamic, unpredictable ways.

Other indoor positioning systems can be based on radio frequency identification (RFID) as passive tags are very cost-effective, ultra wide band (UWB) that gives reduced interference with other devices, infrared (IR) that is included in most mobile devices, visible light communication (VLC) that can use existing lighting systems, or ultrasound waves that move very slowly, which results in much higher accuracy.

The use of tags, such as RFID tags, may be used in combination with tagging each passenger seat or passenger seat row.

Preferably, the crew interface device switches to the galley mode upon detection of having a location within the galley by the indoor positioning system and wherein the crew interface device switches to the cabin mode upon detection of having a location within the passenger cabin.

According to an embodiment, the system comprises a tray comprising a first transceiver that is activated upon receiving the first input data from the server and is used for transmitting and receiving location data of the tray determined by the indoor positioning system. Activating the tray upon receipt of the first input data allows a tray to be dedicated to this first input data and by that to the metadata of the first input data. A crew member can use this dedicated tray to assemble the order according to the first input data on the crew interface device. After assembly of the order, the tray can be loaded on the moveable galley container or can be handheld by the crew member for serving to the passenger matching the first input data. Preferably, the tray is loaded onto the moveable galley container in a position according to the matching input data from the server. When multiple trays are loaded onto the moveable galley container, it would be advantageous to have them in an order that offers efficient serving of the trays, i.e. the trays are loaded in order of the location matching the first input data, such that a tray associated with a passenger seat first encountered during serving is for instance loaded in a top part of the trolley, with the tray associated with a passenger seat encountered subsequently underneath that first tray and so on to a bottom part of the trolley. Serving the trays from the bottom part to the top part of the trolley would be possible as well.

Preferably, the location data of the tray are compared to the first input data to determine a location matching the first input data and wherein the first transceiver emits a signal when the location matching the first input data is reached. Upon serving the tray with the order according to the first input data, the crew member needs to know the location where the tray is to be served. As the location data of the tray is compared to the first input data, preferably the metadata of the first input data, the first transceiver provided on the tray can emit a signal upon reaching the location matching the first input data. This signal is preferably a light signal that lights up upon reaching the seat or row where the passenger is seated. The light can be a LED light that is connected to or implemented in the tray.

According to an embodiment, the moveable galley container comprises a second transceiver for transmitting and receiving location data of the moveable galley container determined by the indoor positioning system. Preferably, the location data are compared to the first input data to localize a passenger seat associated with the metadata from the passenger interface device matching the first input data and wherein the second transceiver emits a signal when the location of the passenger seat is reached. Alternatively or additionally to the signal being emitted by the first transceiver of the tray, the moveable galley container can be provided with a second transceiver that emits a similar or additional signal upon reaching the location of the matching passenger seat. When the crew interface device is mechanically coupled to the trolley, this signal can be received by the crew interface device directly, or can be received by the server that subsequently sends the signal to the crew interface device. In both cases, the signal is transformed to a visual signal, such as the seat number of the passenger on a display.

The second transceiver may also be provided on or in galley containers other than the moveable galley containers. The second transceiver can be used to collect and transmit the third input data to the server. A confirmation of removal of the product from the stock in the galley container can be a signal from a tag located on the product removed from the galley container that triggers a signal in the second transceiver. Such a tag may be an RFID-tag. The signal in the second transceiver is then transmitted, either directly or after processing by a processor provided in the second transceiver, as third input data to the server.

The galley container or trolley may be provided with a memory unit for storing stock data on the stock in the galley container. When the memory unit is connected with the transceiver, the stock data on the memory unit of the galley container can be transmitted to the server on board of the passenger transport vehicle for storing on the memory unit of the server. Moreover, the stock data can be transmitted to the crew interface device, such that the crew can be informed on the stock in the galley container without having to open the galley container to check.

Preferably, the galley container comprises a detector for detecting opening of a door of the galley container, such as a light detector or sensor. Upon opening of a door, the detector gives a signal to the transceiver and/or the memory unit that the door has been opened. This feature can be used to check whether the galley container has been opened prior to boarding after providing the stock to the galley container for safety requirements, which can be helpful for checking for explosives.

Otherwise, or in addition, the signal generated upon opening of the door can be used as a confirmation that the product has actually been removed from the stock in the galley container. The signal is then transmitted to the server as third input data such that the stock data in the database can be updated accordingly.

According to an embodiment, the server is located in the passenger transport vehicle. The stock data is loaded onto the server prior to departure of the passenger transport vehicle. Alternatively, the server is located remotely from the passenger transport vehicle. In this case, a wireless connection to the remote server is established by means of an on board server that may be used for other applications. A remote server can for instance be located at a catering company supplying the galley container.

The invention is also related to a galley container for a passenger catering system as described above. Such a galley container may be a trolley. The galley container can be provided with a transceiver for receiving and transmitting data to a server. This transceiver can be the second transceiver as described above, but can also be a further transceiver.

The invention furthermore relates to a method for operating a passenger catering system as described above by using a server, the server comprising a processor and a memory unit, wherein the processor is connected to the memory unit and wherein the processor is configured to execute the following steps:

receiving first input data from a passenger interface device;
comparing the first input data with stock data in a database stored in the memory unit; and
transmitting first output data to a crew interface device;
wherein the first output data comprise data on available stock coinciding with the received first input data.

The first input data is received from a passenger interface device that can be located at a central travel hub, such as an airport, a train station or a bus station, or a passenger interface device that is a smartphone or a tablet, or a computer device located remotely from the central travel hub, such as personal computer at home or at work. The first input data can be received in advance of a trip and/or during the trip. The stock data is stored in the database prior to the trip, for instance by means of loading the stock data onto the memory unit. Alternatively, the method may comprise receiving the stock data from a remote transmitting device and storing the stock data in the database. The stock data can be transmitted by a third party, such as a passenger transport vehicle caterer, such as an aircraft catering company.

According to an embodiment, the first input data comprise an order of a product from the stock and the method comprises, after receiving the first input data, making a reservation in the stock data for the product, and updating the database accordingly.

After receipt of the first input data comprising an order of a product from the stock, a reservation for that product is made and is linked to the first input data. This reserved product may not be appointed to further first input data, for instance from another passenger requesting a similar product. The database is updated accordingly, such that the stock data is adjusted.

Preferably, the method comprises before receiving the first input data, the step of transmitting the stock data to the passenger interface device. The stock data can be shown to a user, such as a passenger, via a display connected to or comprised in the passenger interface device. According to the shown stock data, the user can then order a product of choice, which order is transmitted to the server via the first input data.

According to a further embodiment, the method comprises:

receiving second input data from the passenger interface device for cancelling the order of the product;
cancelling the reservation of the product after receipt of the second input data; and
updating the database accordingly.

A reservation can be cancelled by second input data received from the passenger interface device. The product from the stock is then released and can be appointed to further first input data received via the passenger interface device, for instance of another passenger.

According to another embodiment, the method comprises transmitting second output data to the passenger interface device, wherein the second output data comprise the stock data on available stock.

In order to inform the passenger of the stock data, second output data are transmitted to the passenger interface device. The stock data can then be displayed and the passenger can make a choice from the available stock. The second output data can be transmitted to the passenger interface device after the stock data have been loaded into the database on the server. This can be any moment before departure of the passenger transport vehicle. Furthermore, the second output data can be transmitted to the passenger interface device after every update of the stock data in the database, such that the passenger can choose between the products in stock that have not yet been removed, i.e. served, and/or reserved by further first input data. The second output data may further comprise data on the time span in which the ordered products according to the first input data may be served by a crew member, for instance between half an hour after takeoff from the point of departure and half an hour before landing and/or arrival of the passenger transport vehicle at the destination.

According to another embodiment, the method comprises receiving third input data from a galley containing the stock, wherein the third input data comprises data on the stock, the method further comprising updating the stock data in the database to the stock in the galley.

The initial stock available on a transport vehicle may be defined by the contents of the galley within the galley containers upon departure. The available stock may change during travelling, as passengers will order products from the stock for consumption or as a gift in case of for instance duty-free sales. After making a reservation, a crew member removes the requested product according to the first input data from the available stock. This removal is registered by the galley and/or galley container, for instance via an RFID tag or other transceiver provided on both the galley and/or galley container and the product, and transmitted to the server and processed by the processor to update the stock data in the database to the stock currently present in the galley container, being different from the stock available upon departure or from before the product was removed from the galley container.

According to a further embodiment, the method comprises transmitting second output data to the passenger interface device after receiving the third input data from the galley, wherein the second output data comprises data on the stock in the galley.

According to another embodiment, the first input data comprise metadata on a matching passenger seat, wherein the metadata are composed by the passenger interface device. This metadata can comprise passenger seat location, passenger name, and/or trip information (flight number, date of travelling, departure time, etc.).

According to a further embodiment, the method comprises indicating a location of a passenger seat matching the metadata of the first input data from the passenger interface device.

According to another embodiment, the method comprises switching the crew interface device from a galley mode when the crew interface device is located at a galley of a passenger transport vehicle to a cabin mode when the crew interface device is located at a passenger cabin of the passenger transport vehicle.

According to a further embodiment, switching the crew interface device from the galley mode to the cabin mode and vice versa is performed after receiving a localization signal from an indoor positioning system for localizing the crew interface device.

According to another embodiment, the method comprises transmitting the first output data when the crew interface device is in the galley mode.

According to another embodiment, the method comprises transmitting the third input data when the crew interface device is in the cabin mode.

According to another embodiment, receiving and transmitting data is performed in a wireless mode.

The invention is moreover related to a computer program comprising instructions that, when loaded onto a memory unit of a server, allow a processor of the server to execute the method as described above.

BRIEF DESCRIPTION OF THE DRAWINGS

The features and advantages of the invention will be further appreciated upon reference to the drawing of an embodiment of the passenger system.

DESCRIPTION OF ILLUSTRATIVE EMBODIMENTS

The FIGURE shows a schematic drawing of an example of the passenger catering system 1 according to the invention. The passenger catering system 1 is used on a passenger transport vehicle (not shown), such as an aircraft. The passenger catering system 1 comprises a server 2 comprising a processor 13 and a memory unit 14 that are connected to each other. The server 2 is arranged to receive input data 4, 8, 8' and transmit output data 6, 7. The passenger catering system 1 furthermore comprises a crew interface device 5, such as a tablet. A galley container 10 is stored in a galley 9, which galley container 10 comprises stock for catering passengers on board of the aircraft. A moveable galley container or trolley 10 is used to for serving in a passenger cabin (not shown).

First input data 4 are received by the processor 13 after transmittal from a passenger interface device 3. The processor 13 compares the first input data 4 with stock data (not shown) in a database stored in the memory unit 14. First output data 6 are then transmitted to the crew interface device 5, where a crew member can see the first output data 6 on a display of the device.

The first input data 4 comprises data on an ordered product and the time when the product to be served, but also metadata on the flight plan, the passenger seat, flight number, etc. The first input data 4 generate a reservation of the related product in the database of the server, such that no further first input data 4 can be linked to the product. The database is updated accordingly. This update triggers the transmission of second output data 7 to the passenger interface device 3.

To cancel the reservation, the passenger interface 3 transmits second input data 11 to the server 2. Upon receipt of the second input data 11, the server 13 cancels the reservation of the product and updates the database accordingly. After every update of the database, second output data 7 are transmitted to the passenger interface device 3.

To confirm the reservation, the passenger interface 3 transmits fourth input data 12 to the server 2. Upon receipt of the fourth input data 12, the server confirms the reservation of the product, as if the product was already removed from the stock in the galley container 10 or galley 9. The database is updated accordingly.

After confirmation of the reservation by means of the transmittal of the fourth input data 12 and the receipt thereof of the server 2, the first output data 6 are transmitted to the crew interface device 5 and visualized through a display. A crew member can then assemble the order according to the visualized first output data 6 and serve the order to the passenger seat matching the metadata and on the moment of choice according to the first input data 4. Upon assembly of the order, the galley 9 or galley container 10, depending on the location of assembly, transmits second input data 8, 8' to the server to confirm removal of the product and/or the assembly of the order.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

LIST OF PARTS

1. Passenger catering system
2. Server
3. Passenger interface device
4. First input data
5. Crew interface device
6. First output data
7. Second output data
8+8'. Second input data
9. Galley
10. Galley container
11. Third input data
12. Fourth input data
13. Processor
14. Memory unit

The invention claimed is:

1. A method for operating a passenger catering system having a server including a processor and a memory unit, the method comprising:

receiving first input data from a passenger interface device by the server;

comparing the first input data with stock data in a database stored in the memory unit; and transmitting first output data to a crew interface device, wherein the first output data comprise data on available stock coinciding with the received first input data;

localizing the crew interface device based on a localization signal received from an indoor positioning system; and switching the crew interface device between a galley mode when the crew interface device is located in a galley of a passenger transport vehicle and a cabin mode when the crew interface device is located in a passenger cabin of the passenger transport vehicle based on the localization signal.

2. The method according to claim 1, comprising receiving the stock data from a remote transmitting device and storing the stock data in the database.

3. The method according to claim 1, wherein the first input data comprise an order of a product from the stock, and further comprising:

after receiving the first input data, making a reservation in the stock data for the product; and updating the database accordingly.

4. The method according to claim 3, comprising:

receiving second input data from the passenger interface device for cancelling the order of the product;

cancelling the reservation of the product after receipt of the second input data; and updating the database accordingly.

5. The method according to claim 1, comprising transmitting second output data to the passenger interface device, wherein the second output data comprise the stock data on available stock.

6. The method according to claim 1, comprising:

receiving third input data from a galley containing the stock, wherein the third input data comprise data on the stock in the galley;

updating the stock data in the database to the stock in the galley; and transmitting second output data, which comprise data on stock in the galley, to the passenger interface device after receiving the third input data from the galley.

7. The method according to claim 6, comprising transmitting the first output data when the crew interface device is in the galley mode and/or transmitting the third input data when the crew interface device is in the cabin mode.

8. The method according to claim 1, wherein the first input data comprise metadata on a matching passenger seat composed by the passenger interface device, and further comprising indicating a location of a passenger seat matching the metadata of the first input data from the passenger interface device.

9. A passenger catering system for a passenger transport vehicle, the system comprising:

a passenger interface device;

server comprising a processor and a memory unit, wherein the server is configured to receive first input data from the passenger interface device and to compare the received first input data with stock data stored in a database in the memory unit;

a portable crew interface device configured to receive first output data, wherein the first output data comprise data on available stock coinciding with the received input data; and an indoor positioning system configured to localize the portable crew interface device and/or a moveable galley container in the passenger transport vehicle, wherein the crew interface device switches to a galley mode when the indoor positioning system detects that the crew interface device is localized in a galley of the passenger transport vehicle and the crew interface switches to a cabin mode when the indoor positioning system detects that the crew interface device is localized in a passenger cabin of the passenger transport vehicle.

10. The passenger catering system according to claim 9, wherein the moveable galley container contains a stock of available products, and the stock data comprise data on the stock in the galley container.

11. The passenger catering system according to claim 9, wherein the first input data comprise a product order from the stock in the galley container, and the server is configured to make a reservation of the product based on the received first input data.

12. The passenger catering system according to claim 9, wherein the moveable galley container contains products ordered according to the first input data and is used to serve the ordered products to a passenger matching the first input data.

13. The passenger catering system according to claim 9, wherein the galley comprises a first docking station adapted for stationing the crew interface device when the crew interface device is in the galley mode, and the moveable galley container comprises a second docking station adapted for stationing the crew interface device when the crew interface device is in the cabin mode.

14. The passenger catering system according to claim 9, comprising a tray including a first transceiver that is configured to be activated upon receiving the first input data from the server, wherein the first transceiver is configured to transmit and receive location data of the tray determined by the indoor positioning system.

15. The passenger catering system according to claim 14, wherein the moveable galley container comprises a second transceiver configured to transmit and receive location data of the moveable galley container determined by the indoor positioning system, wherein the location data are compared to the first input data to localize a passenger seat associated with metadata from the passenger interface device matching the first input data, and the second transceiver is configured to emit a signal when the location of the passenger seat is reached.

16. The passenger catering system according to claim 9, wherein the passenger interface device is located at a central travel hub.

17. The passenger catering system according to claim 9, wherein the passenger interface device is an integral part of an onboard entertainment system.

18. A passenger catering system for a passenger transport vehicle comprising:

a server comprising a processor and a memory unit, wherein the server is configured to receive first input data from the passenger interface device and to compare the received first input data with stock data stored in a databased in the memory unit;

a portable crew interface device configured to received first output data, wherein the first output data comprise data on available stock coinciding with the received input data;

a moveable galley container;

an indoor positioning system configured to localize the moveable galley container in the passenger transport vehicle; and a transceiver configured to activate after receiving the first input data from the server and to transmit and receive location data of the moveable galley container determined by the indoor positioning system, wherein the location data of the galley container are compared to the first input data to determine a location matching the first input data, and the transceiver is configured to emit a signal when the location matching the first input data is reached.

* * * * *